April 12, 1955

M. NICHOLS 2,706,055

TOWING ATTACHMENT FOR MOTOR VEHICLES

Filed Sept. 10, 1951

INVENTOR.
MORGAN NICHOLS
BY
Gregory S. Dolgorukov
ATTORNEY.

United States Patent Office 2,706,055
Patented Apr. 12, 1955

2,706,055

TOWING ATTACHMENT FOR MOTOR VEHICLES

Morgan Nichols, Detroit, Mich.

Application September 10, 1951, Serial No. 245,789

3 Claims. (Cl. 214—86)

This invention relates to towing devices for motor vehicles, and more particularly to an attachment to a passenger motor vehicle, whereby such vehicle can be converted into a towing vehicle as occasion therefor arises.

Towing disabled vehicles to repair stations, rather than attempting to repair a disabled vehicle in the field, has greatly increased within the last fifteen years and, being a more reliable and efficient way of handling a situation of such a nature, is constantly increasing. In fact, a motor vehicle operator is becoming more and more dependent on a repair station, and emergency tools which used to be supplied with a new vehicle as standard tools, such as a tire pump, a starting crank, and the like, are no longer provided with new vehicles.

The improved road system, great increase in the number of garages, repair and service stations, and particularly in the number of gasoline or filling stations, most of which are nowadays equipped to do a wide range of standard repair operations, with many open 24 hours a day, make the above trend a natural development.

It would be appreciated, however, that in the above situation, towing equipment is the connecting link between the public in need of emergency or road service and the repair or service stations. Therefore, unless such equipment is available wherever needed, is efficient and easily operable, those in need of emergency or road service remain separated from places or organizations where such service is available.

The need for an inexpensive and practical towing device which would be within means of a small filling station has been keenly felt for a number of years, and such need grows more and more acute. At the present time standard towing equipment is almost invariably in the form of specially equipped trucks the cost of which is high. Purchase of such a towing truck usually requires an investment of several thousand dollars and therefore is not within means of an ordinary gasoline or filling station. For this reason such towing trucks are usually found only in well equipped garages, service stations and in larger gasoline or filling stations. Moreover, wherever available, such towing trucks do not always present an efficiently operable device, ensuring a sufficiently low cost of towing service. In the first place such a truck requires a special operator, and it may remain idle for considerable periods of time between the calls, during which periods the operators subject to such calls cannot be depended upon for any continuous work. Average trips are relatively long and are costly to the public. During the towing trip the customer has to ride in the truck with the truck driver. Climbing up into a truck seat and riding therein is difficult for many passenger car operators.

It is clear that investing several thousand dollars into such a towing truck is impractical for a small service or filling station many of which can be expected to receive several calls per day. The initial investment, upkeep, and operation of such a truck would be prohibitively high in cost for such an organization.

One of the objects of the present invention is to provide an improved towing device for motor vehicles whereby the above difficulties and disadvantages are overcome and largely eliminated, and simple, efficient, and inexpensive device forming a better link between the repair stations and those in need of emergency and road repairs and service is made available.

Another object of the present invention is to provide a towing attachment which can be easily carried in collapsed form in the back or trunk compartment of a passenger motor vehicle until needed, and removed therefrom only at the place where a disabled vehicle has to be picked up.

A still further object of the present invention is to provide an attachment for passenger motor vehicles for towing other passenger vehicles, which attachment includes a hoisting mechanism and thus enables hoisting the front end or the rear end of a towed vehicle, and yet does not impose the entire weight of the end of the towed vehicle on the rear wheels of the towing passenger vehicle.

A further object of the present invention is to provide a towing attachment for towing disabled passenger motor vehicles and adapted to be carried by another passenger motor vehicle, means being provided therein transmitting pulling, braking and turnnig forces to the towed vehicle, and following unevenness of the road.

A still further object of the present invention is to provide an attachment for passenger motor vehicles for towing other passenger motor vehicles, whereby the necessity of having customers ride in a towing truck is eliminated, and a customer, usually already inconvenienced and upset, is spared further inconveniences.

It is an added object of the present invention to provide a construction of the foregoing character, which is simple and rugged in construction, safe and dependable in operation, and is relatively inexpensive to manufacture.

Further objects and advantages of this invention will be apparent from the following description and appended claims, reference being had to the accompanying drawings forming a part of this specification, wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention, I provide an attachment adapted to be installed in the rear or trunk compartment of a passenger motor vehicle or attachable thereat in such a manner that the attachment can be folded into such a compartment and the lid closed thereon. For use, the lid of the trunk or rear compartment is opened, and the attachment is retracted therefrom and is rested on the ground. Thereupon the attachment is rolled under the front end or under the rear end of the disabled vehicle. The attachment includes wheels and therefore is adapted to support the major portion of the weight of the end of the disabled vehicle. The attachment includes hoisting means whereby the end of the disabled vehicle is hoisted up sufficiently to clear the wheels of the disabled vehicle from the ground. The attachment engages the front axle of the disabled vehicle and is adapted to have a secure hold thereon. However, for safety purposes, a chain connection between the two vehicles is also provided. The attachment is adapted to transmit to the disabled vehicle pulling forces for moving the disabled vehicle forward, and to resist the pushing forces which may be exerted by the disabled vehicle. It is so constructed that in turning, forces on both vehicles are applied at advantageous points. Hoisting means are preferable of hydraulic type. However hoisting means of mechanical type, pneumatic type, and of other types may also be used, if desired.

Figure 1:
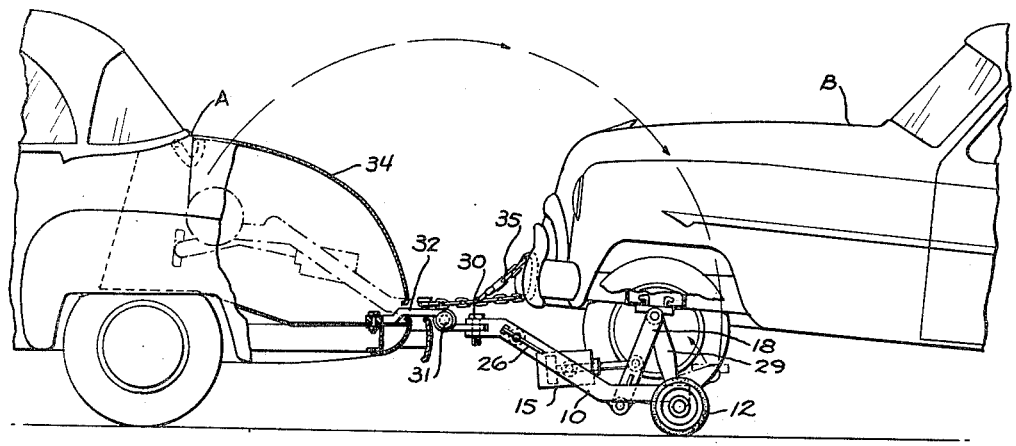
Fig. 1 is a side view, partly in section, showing a towing attachment embodying the present invention.
Figure 2:
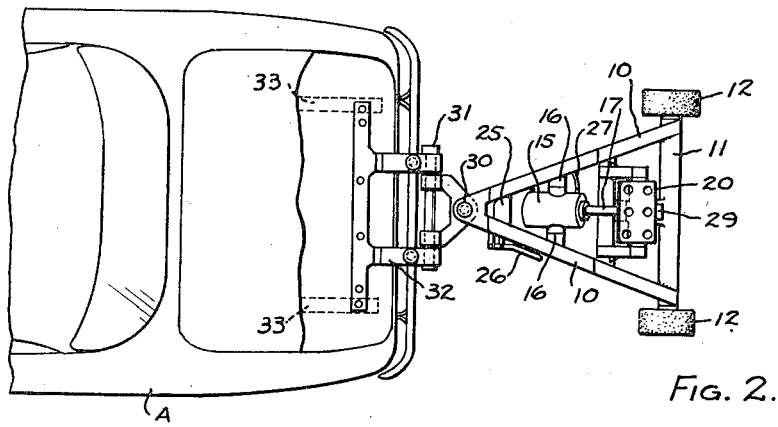
Fig. 2 is a top view of the construction of Fig. 1, the towed vehicle being removed for the sake of clarity of the drawing.
Figure 3:
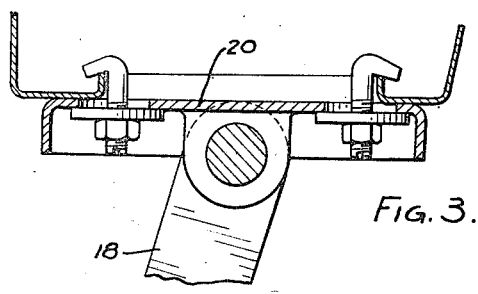
Fig. 3 is a fragmentary side view of the axle-contacting shoe.

In the drawing there is shown, by way of example, a towing attachment embodying the present invention and installed in the truck compartment of a passenger motor vehicle generally designated by the letter A. Referring to Figs. 1–3, the attachment illustrated therein comprises a frame having side members 10, 10 and a rear member 11. The members 10, 10 are secured together at their front ends, their rear ends being welded or otherwise secured to the rear member 11 carrying at its extremities wheels 12, 12. The frame so constructed appears triangular in the top view. However in side view the side members 10, 10 appear shaped as is shown in Fig. 1.

The frame carries a hoisting device comprising a hydraulic cylinder 15 mounted for limited oscillatory movements in trunnions 16, 16 and having a piston with rod 17 slidably fitted therein. The piston rod 17 has its end hinged to the middle of a link bracket 18 having its lower end mounted on members 10, 10 with the aid of trunnions 19, 19. The upper end of the bracket 18 carries a shoe 20 adapted to contact and engage the front axle of a disabled passenger vehicle. The shoe 20 is separable from the bracket 18, and a number of shoes specially designed to engage the front or the rear axle of particular vehicles may be provided or carried with the attachment.

A hydraulic pump 25 operable with the aid of a handle 26 is also carried by the frame, said pump being hydraulically connected to the rod end of the cylinder 15 with the aid of a conduit 27. Valve means (not shown) provided in said conduit permit connecting the rod end of the cylinder with the fluid reservoir in order to permit relieving hydraulic pressure in the cylinder.

When the pressure in the cylinder 15 is relieved and the fluid is returned from the rod end of the cylinder into the reservoir, the bracket 18 and the shoe 20 are brought into their lowermost position as shown in dotted lines in Fig. 1. The height of the wheels 12 and other dimensions of the attachment are so selected that with such position of the bracket 18 and shoe 20, the attachment may be rolled under the front (or rear) end of a disabled passenger vehicle such as B, to have the shoe 20 engage the front (or rear) axle thereof. When the handle 26 of the pump 25 is operated to pump the fluid into the cylinder 15, the piston thereof is pushed to move the shoe 20 upward, as indicated by arrows, into the position shown in Fig. 1 in full lines. In such a position of the shoe the front end of the vehicle is raised sufficiently to clear the front wheels thereof from the ground. It should be noted that as the shoe 20 moves upward, the mechanical advantage at which forces are applied to said shoe increases. It should be also appreciated that at the beginning of the upward movement of the shoe 20 when mechanical advantage is smaller, the tires and front springs of the disabled vehicle usually assist the raising force.

A support rod 29 carried by the end of the bracket 18 is adapted to assume a vertical position under its own weight when the bracket 18 is fully raised, and to contact a support on the frame of the attachment, thus providing in towing a positive support for the front end of the vehicle B, when due to slight leakage of the fluid the bracket 18 begins to go down. For release of the rod 29 the pump is operated to bring the bracket 18 into its uppermost position, and the rod 29 is moved away from the support on the frame. Thereupon the fluid from the cylinder 15 is permitted to pass back into the reservoir. Restricted orifice in the valve prevents excessively fast downward movement of the bracket 18 under the weight of the supported vehicle.

The frame of the attachment is connected to the towing vehicle with the aid of, in effect, a universal connection which is adapted to transmit pulling and pushing forces, turning forces, and to permit the attachment to follow unevenness of the ground while transmitting such forces. In the present embodiment of the invention such universal connection is exemplified by a loose vertically disposed hinge 30 providing for turning of the attachment around a vertical axis, such as required in going around a corner, and for its limited rocking around a horizontal axis longitudinally of the attachment, as is required, for instance, when one of the wheels thereof is going over a raised spot on the road. A horizontal hinge 31 disposed transversely of the attachment operates to accommodate the attachment when both of its wheels go over a high or low spot on the road.

The hinge 31 is mounted in the bracket 32 which is secured to the frame members 33, 33 of the vehicle A, as is best shown in Fig. 2. Part of the bracket 32 is thus arranged within the trunk compartment at the vehicle A, the remaining part protruding therefrom. The lid 34 of the trunk compartment is suitably recessed to permit closing the lid.

By virtue of such a connection the attachment, when not in use, may be raised from the ground and folded into the trunk compartment. Also the attachment may be disconnected at the hinge 30 or 31 and left standing in the garage or station waiting for calls, or be attached to another vehicle provided with a bracket such as 32.

A chain connection such as shown in 35 is an additional safety feature. A similar connection may be provided at the shoe 30, if desired.

Figure 4:
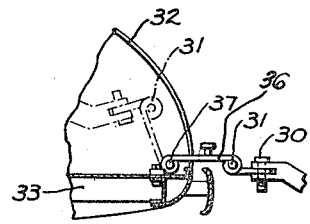
Fig. 4 is a fragmentary side view showing a modified construction of the connection of the towing attachment to the towing vehicle.

Fig. 4 shows a modified hinge connection in which an additional link such as 36 is provided. With such a construction no recessing of the lid is required, since the bracket can be also folded away together with the entire attachment by being turned around a hinge 37.

It will now be understood in view of the foregoing that hinges 30 and 31 provide, in effect, a universal connection of the frame of the attachment to the towing vehicle A. While I prefer to effect such connection with the aid of two hinges, a single universal connection such as one of the ball-and-socket type may also be used, if desired.

By virtue of providing the above-disclosed attachment, objects of the present invention listed above and numerous added advantages are attained.

I claim:

1. A towing attachment for a passenger motor vehicle, said attachment comprising a wheeled unitary frame adapted to be rolled under the front axle of a disabled passenger motor vehicle, a hoisting device carried by said frame and adapted to be manually operated to raise said front end and thus to transfer a substantial portion of the weight thereof on the wheels of said frame, and a universal connection for attaching said frame to the frame of the towing vehicle at the trunk compartment thereof for folding into said compartment and unfolding therefrom by swinging around a horizontal axis.

2. The construction defined in claim 1 with the hoisting device including a hydraulic piston, and an axle-contacting shoe, and a linkage operatively connecting said shoe to said piston.

3. A towing attachment for a passenger motor vehicle, said attachment comprising a triangular unitary frame having at its front angle a universal connection for attaching the frame to the towing vehicle, and two wheels at its other angles, the wheeled end of the frame being adapted to be rolled under an axle of a disabled vehicle, a hydraulic hoisting device carried by said frame and adapted to be manually operated to raise said front end at least to clear the front wheels from the ground, said frame being further adapted to be folded into the rear compartment of the towing motor vehicle by being swung around the horizontal axis provided by said universal connection.

References Cited in the file of this patent

UNITED STATES PATENTS

| | | |
|---|---|---|
| 1,349,198 | Gould | Aug. 10, 1920 |
| 1,435,065 | Holmes | Nov. 7, 1922 |
| 2,113,879 | Delalandre | Apr. 12, 1938 |
| 2,254,437 | Marney | Sept. 2, 1941 |
| 2,436,000 | Fleming | Feb. 17, 1948 |
| 2,495,493 | Wright | Jan. 24, 1950 |
| 2,497,379 | Vandergrift, Sr., et al. | Feb. 14, 1950 |
| 2,553,229 | Barhorst | May 15, 1951 |
| 2,564,111 | Kimball | Aug. 14, 1951 |
| 2,628,733 | Hale | Feb. 17, 1953 |

FOREIGN PATENTS

| | | |
|---|---|---|
| 911,061 | France | Feb. 25, 1946 |
| 921,501 | France | Jan. 13, 1947 |